United States Patent
Rolia et al.

(10) Patent No.: US 7,970,902 B2
(45) Date of Patent: Jun. 28, 2011

(54) COMPUTING UTILITY POLICING SYSTEM AND METHOD USING ENTITLEMENT PROFILES

(75) Inventors: Jerry Rolia, Kanata (CA); Xiaoyun Zhu, San Jose, CA (US); Martin Arlitt, Calgary (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1887 days.

(21) Appl. No.: 10/804,724

(22) Filed: Mar. 19, 2004

(65) Prior Publication Data

US 2005/0210262 A1 Sep. 22, 2005

(51) Int. Cl.
*G06F 15/173* (2006.01)
(52) U.S. Cl. ...................................... 709/226
(58) Field of Classification Search ............... None
See application file for complete search history.

(56) References Cited

U.S. PATENT DOCUMENTS

| | | | |
|---|---|---|---|
| 4,481,583 A * | 11/1984 | Mueller | 710/244 |
| 5,274,644 A * | 12/1993 | Berger et al. | 370/230 |
| 5,933,417 A * | 8/1999 | Rottoo | 370/260 |
| 6,647,448 B1 * | 11/2003 | Brelin | 710/107 |
| 6,877,035 B2 * | 4/2005 | Shahabuddin et al. | 709/226 |
| 7,171,470 B2 * | 1/2007 | Doyle et al. | 709/225 |
| 2004/0128384 A1 * | 7/2004 | Rolia et al. | 709/226 |
| 2005/0165925 A1 * | 7/2005 | Dan et al. | 709/224 |
| 2005/0172291 A1 * | 8/2005 | Das et al. | 718/104 |
| 2005/0198231 A1 * | 9/2005 | Gasca et al. | 709/221 |

* cited by examiner

*Primary Examiner* — Ario Etienne
*Assistant Examiner* — Clayton R Williams

(57) ABSTRACT

A method and system for policing resources in a computing utility facility includes policing resources in a computing utility facility includes intercepting a request for resources from an application admitted to access a pool of resources associated with the computing utility facility, acquiring an entitlement profile associated with the application to determine if application is entitled to requested resources over a time period, identifying an entitlement value and corresponding sliding window of the time period from the entitlement profile, determining if the request for resources exceeds the entitlement value associated with the sliding window and indicating application entitlement to the request for resources in response to the determining if the request is excessive.

28 Claims, 11 Drawing Sheets

*Demand Profile A (Weekday) for Resource Pool X*   — 202

| Time Slot | Mon. | CoS | Tues. | CoS | Wed. | CoS | Thurs. | CoS | Fri. | CoS |
|---|---|---|---|---|---|---|---|---|---|---|
| 8:00 | 88 | 1 | 88 | 1 | 89 | 2 | 90 | 2 | 26 | 2 |
| 9:00 | 88 | 1 | 91 | 1 | 94 | 2 | 93 | 2 | 27 | 2 |
| 10:00 | 13 | 2 | 14 | 2 | 18 | 2 | 14 | 2 | 25 | 3 |
| 11:00 | 16 | 2 | 15 | 2 | 16 | 3 | 93 | 3 | 33 | 4 |
| 12:00 | 14 | 2 | 16 | 2 | 17 | 3 | 11 | 3 | 43 | 4 |
| 1:00 | 15 | 3 | 12 | 3 | 13 | 3 | 14 | 3 | 65 | 3 |
| 2:00 | 89 | 3 | 89 | 3 | 89 | 3 | 90 | 3 | 45 | 2 |
| 3:00 | 87 | 3 | 87 | 3 | 87 | 3 | 56 | 1 | 23 | 1 |

*Demand Profile B (Weekend) for Resource Pool X*

| Hour | Sat. | CoS | Sun. | CoS |
|---|---|---|---|---|
| 8:00 | 12 | 3 | 12 | 4 |
| 9:00 | 14 | 3 | 14 | 4 |
| 10:00 | 13 | 3 | 14 | 4 |
| 11:00 | 17 | 3 | 17 | 4 |
| 12:00 | 14 | 3 | 16 | 4 |
| 1:00 | 13 | 4 | 16 | 4 |
| 2:00 | 15 | 4 | 16 | 4 |
| 3:00 | 20 | 4 | 145 | 4 |

— 204

Caveat Demand Profile for Resource Pool X

— 206

| Hour | Event A Start Date | Event A End Date | CoS | Event B Start Date | Event B End Date | CoS | Event C Start Date | Event C End Date | CoS |
|---|---|---|---|---|---|---|---|---|---|
| 8:00 | 90 | 9 | 1 | 60 | 3 | 2 | 5 | 5 | 3 |
| 9:00 | 89 | 10 | 1 | 50 | 6 | 2 | 7 | 12 | 3 |
| 10:00 | 65 | 9 | 2 | 35 | 8 | 2 | 45 | 20 | 4 |
| 11:00 | 25 | 20 | 2 | 10 | 12 | 3 | 67 | 12 | 4 |
| 12:00 | 12 | 45 | 2 | 7 | 40 | 3 | 89 | 11 | 2 |
| 1:00 | 12 | 60 | 2 | 7 | 54 | 3 | 10 | 2 | 2 |
| 2:00 | 10 | 70 | 3 | 8 | 67 | 1 | 5 | 8 | 2 |
| 3:00 | 9 | 85 | 3 | 12 | 61 | 1 | 6 | 7 | 2 |

*FIG. 2A*

COMPUTING UTILITY POLICING SYSTEM AND METHOD USING ENTITLEMENT PROFILES

BACKGROUND OF THE INVENTION

The present invention relates to utility computing. In a utility computing environment, utilization is improved by increasing the availability of servers and other computing resources to more people and their applications. Instead of sitting idle for a single application, these resources are used to execute programs for many users. Information technology infrastructure costs are reduced as computer resources are not purchased to only solve a single complex task for a department or division in a company. Instead utility computing allows the computer resources to be used by many different people during both peak periods and periods otherwise considered off-peak. Properly implemented, utility computing reduces the need for more resources as existing resources can be shared.

Utilization efficiency in the utility computing facility depends to a large extent on governing access to the pools of resources associated with the utility computing facility. It also depends on the ability of the system to accommodate the application demand and usage requirements in the future. Unfortunately, existing conventional systems have not been able to properly monitor or anticipate access to these pools of resources and deal with the relatively complex demand patterns that may be present in an enterprise or organization.

A number of conventional solutions only assure users and applications that a "best effort" will be made to allocate certain computing resources. The best effort approach does not allow for higher assurances if the customers are interested in higher availability of resources.

Other solutions allow customers to make monetary bids on computing utilities thereby indicating a desired quality of service or service assurance when using the resources. These systems are often driven by service level agreements or SLAs with higher paying customers receiving higher levels of service and resources. It remains unclear; however, what quality of service customers entering lower monetary bids are provided given the focus on this higher paying customer base.

Yet other utility computing solutions gauge access to pools of resources based upon transaction response times for different applications. The systems managing resources in this manner are complicated. They tie quality of service to the responsiveness of a particular application rather than the overall responsiveness of resources in the computing utility. This approach to resource management may improve performance for certain applications but overall may not improve the performance or efficiency associated with the computing utility.

As companies cut costs in information technology budgets, there is parallel demand to improve the information technology infrastructure for people to work more efficiently. Large server farms and clusters of computers can be used to improve the utilization of computing resources in an enterprise or company if utility computing is deployed effectively. Indeed, for certain applications having predictable execution schedules and demand requirements the conventional utility computing environments previously described are more useful. For example, conventional utility computing environments are more useful for batch programs as they are scheduled to run in advance and have certain predictable demand requirements during execution.

Unfortunately, implementing utility computing for business applications that are critical to the operation of a company is a much more difficult task. These business applications are generally very different in nature and have non-uniform computing needs. If a computing utility is unable to provide the necessary resources, business processes may not be performed resulting not only in delayed productivity but reduced business transactions and lost revenue. Improved controls for computing utility environments are needed to efficiently run business, engineering, and other applications having less predictable demand or schedules for demand yet require precise levels of assurances regarding access to resources.

BRIEF DESCRIPTION OF THE DRAWINGS

FIG. 2A is a set of demand profile tables designed in accordance with one implementation of the present invention;

Like reference numbers and designations in the various drawings indicate like elements.

SUMMARY OF THE INVENTION

One aspect of the present invention features a method and system of policing resources in a computing utility facility. The policing includes intercepting a request for resources from an application admitted to access a pool of resources associated with the computing utility facility, acquiring an entitlement profile associated with the application to determine if application is entitled to requested resources over a time period, identifying an entitlement value and corresponding sliding window of the time period from the entitlement profile, determining if the request for resources exceeds the entitlement value associated with the sliding window and indicating application entitlement to the request for resources in response to the determining if the request is excessive.

DETAILED DESCRIPTION

Aspects of the present invention are advantageous in at least one or more of the following ways. Policing resources in a computing utility is performed within smaller time period bracketed by an entitlement window. By analyzing recent statistical behavior of an application or class of applications, the computing utility is able to accurately predict the future resource demands from the aggregate of applications admitted to the computing utility facility.

The entitlement window also allows the computing utility to identify and address applications requiring additional resources before it impacts the utility. Requests for resources are not provided when the actual resource requirements do not closely match the expected demand even if the application has a right to a larger aggregate of resources. Computing utilities can deny or throttle the resources requested by the applications during a shorter entitlement window without suffering penalties or other contractual obligations as a result. Similarly, the computing facility utility can withdraw or clawback resources from applications overusing allocated resources also without suffering a similar fate.

In general, the entitlement profile allows the computing utility to accommodate a variety of applications having bursty and non-bursty resource requirements while using a common platform. Typically, the entitlement profile for each application computes a measure of burstiness based on underlying trace data collected over a period of time. The application's expected bursts for resources are included in the entitlement profile and augments other information in the demand profile. Together the demand profile augmented by the entitlement profile of the present invention facilitates characterizing the resource requirements for the application.

Figure 1:
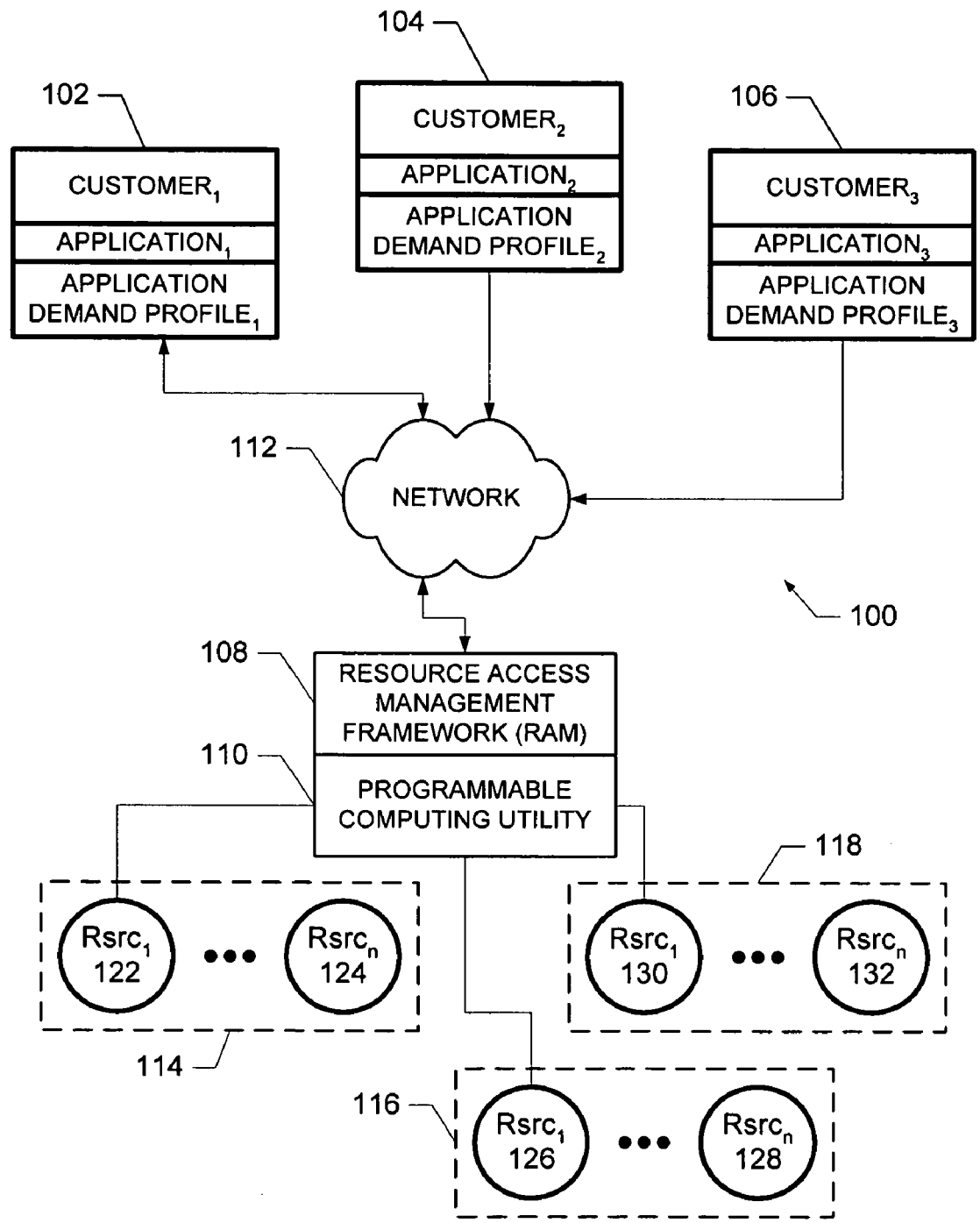
FIG. 1 is a block diagram overview of a system for governing access to resources in a computing utility facility in accordance with one implementation of the present invention.

FIG. 1 is a block diagram overview of a system for governing access to resources in a computing utility facility in accordance with one implementation of the present invention. System 100 includes a series of customers 102, 104 and 106 each having an application and an application demand profile with class of service designations. As previously mentioned, each demand profile is enhanced with information and functionality associated with the entitlement profile of the present invention. Alternate implementations of the present invention can readily be scaled to accommodate customers having multiple applications and corresponding multiple demand profiles.

In this particular implementation, customers 102, 104 and 106 in system 100 communicate over network 112 to a resource access management (RAM) framework 108, a programmable computing utility 110 and resource pools 114, 116, and 118. Alternatively, customers 102, 104 and 106 can communicate directly to other portions of system 100 rather than over network 112. Class of service designations correspond to each application and may be different even if the same customer operates multiple different applications on system 100.

Resource pools 114, 116 and 118 include a range of resources including resource 122 to resource 124, resource 126 to resource 128 and resource 130 to resource 132 respectively. Each range of resources may include one or more different resources arranged in different organizational schemes as appropriate for the particular customers/applications being served and as required logistically by the system setup. For example, resources can be pooled according to the type of resource (i.e., pools of storage devices, pools of processors, pools of graphics rendering processors or pools of network nodes), the quality of the resources, (i.e., pools of high-availability devices and pools of medium reliability devices or low-cost devices) or any other logical method of grouping the resources. Additional groupings of these resources may be implemented either logically or physically to better provide for the different classes of service as needed.

Customers 102, 104 and 106 submit application demand profiles along with their applications to resource access management framework 108. The demand profile associated with each application describes the pattern of demand for certain resources in one or more pools of resources as a series of cycles or as a poly-cyclic representation of demand over time. In accordance with the present invention, customers also specify a class of service on a per application basis for the computing utility facility to consider when admitting the application. A single class of service for a particular application can be specified or the class of service may vary depending on the time and date. Accurately predicting overall demand for resources by the various applications depends on the accurate representation of resources needed in each of the demand profiles, the cyclic demand on these resources made by the applications and the class of service associated with each application. Both the quantity and quality of underlying trace data used to construct the demand profile affects the accuracy of predicting demand.

Resource access management framework 108 qualifies and admits certain applications in accordance with implementations of the present invention before the applications are able to make requests for resources and begin processing data, run business applications or otherwise utilize any of the resources associated with programmable computing utility 110. In particular, computing utility 110 ensures that the class of service requested by an operator or application can be provided in light of the polycyclic constraint on resources from one or many different applications and customers.

Once admitted, resource access management framework 108 continues to police admitted applications to ensure they do not attempt to over utilize resources, impact other admitted applications or otherwise operate outside their submitted demand profiles. Class of service level designations associated with each application do not alter the policing operation yet influence how resources are subsequently distributed or reallocated to those applications flagged during this process. Overall, subsystems within computing utility 110 work together on behalf of the individual applications to ensure data processing and storage access continues once they have been admitted and entitled to the various actual resources.

FIG. 2A is a set of demand profile tables designed in accordance with one implementation of the present invention. These example demand profiles tables include a demand profile A 202, a demand profile B 204 and a caveat demand profile 206 for a resource in pool of resources "X". Each table in this example contributes a different cycle of demand and time varying class of service forming a poly-cyclic demand for a resource by the application. While other resources may be used by the application they are omitted for brevity and clarity of this example. Accordingly, additional resources would be specified in different demand tables corresponding to other resources and pools of resources. Class of service may also be specified in different tables and associated with applications operating on different dates and times.

Alternate implementations can organize the demand profiles and tables of the present invention in many different ways including multi-dimensioned data structures and objects having a hierarchical organization using inheritancy and other object-oriented features. They also may include different notations and granularities for referencing schedules. For example, a 24-hour notation could be used specifying all hours of the day rather than the conventional time indicated to avoid ambiguities between A.M. and P.M. hours. In addition to example values illustrated in FIG. 2A, alternate implementations may use scalar values, values representing distributions or values representing data that contributes to such distributions. Further the illustrated demand profiles separate weekdays form weekends however, alternate schemes for organizing calendar dates can also be adopted that organize dates according to days, weeks, months, years or any other divisions that satisfy the particular needs of the implementation.

As previously mentioned, the complete demand profile for an application is composed of many smaller individual cycles and form a polycyclic pattern of demand. In the present example in FIG. 2A, demand profile A 202 represents the cycle of demand during weekdays by a particular application for a particular resource pool X. Each application also specifies a desired time varying class of service for processing the application at the various points in time as illustrated.

The demand in this example is divided into 1-hour time slots and assumed to be statistically identical throughout each 1-hour time slot. For example, demand profile A 202 indicates that the demand for a resource pool X by the application is higher in the morning (i.e., 8:00 am to 9:00 am) and the later afternoon (i.e., 2:00 pm to 3:00 pm) Monday through Thursday.

Each hour in demand profile A 202 also specifies a class of service associated with processing the particular application at the particular time slot or period. Depending on the implementation of the present invention, the class of service entered in demand profile A 202 may represent the minimum requested class of service desired and acceptable by the application. If the utility delivers a lower class of service to the application the utility may be penalized. Likewise; the utility can also deliver a class of service equal or higher than the minimum class of service to avoid penalties. Depending on the actual service agreement, the utility may or may not receive a premium for delivering a class of service beyond the minimum entered in the demand profile. Details on the different class of service levels and their use in allocating resources are described in further detail later herein.

According to demand profile A 202, the demand profile for this resource on a Friday is different from the demand profile for the same resource during the other days of the week. Similarly, the class of service designations in demand profile A 202 also varies from day to day and hour to hour. This time varying class of service specified with each application allows processing power and associated fees for processing the applications to be efficiently and dynamically distributed rather than constantly or statically distributed to the same application or applications over time. As illustrated, demand profile A 202 also reflects expected uncharacteristic spikes in demand that may arise as noted on Thursday at 11:00 am where the demand index rises to "93" rather than 15 or 16 as on preceding days. Tailoring the class of service required and demand levels in accordance with the present invention allows resources to be utilized more efficiently and at a lower price point to the end users. Of course, while 1-hour slots have been used to simplify this example, alternate implementations of the present invention may use different size time slots or variable time slots of any equal or unequal durations.

Demand profile B 204 is a different table representing the demand and class of service by the same application on weekends rather than during the week. Consequently, to determine the overall demand from the application, demand profile A 202 (weekday) is combined with demand profile 204 (weekend) forming the polycyclic demand with time varying class of service requirements for the resource. Alternate implementations could combine more than two different cycles to create more refined and complex polycyclic demand patterns.

An additional caveat demand profile 206 can also be added to the poly-cyclic demand to represent events that occur more infrequently or over longer periods of times. Despite the potential infrequency of these events occurring, implementations of the present invention also combine time varying class of service with these events. Events entered in caveat demand profile 206 may include special events, holidays, seasonal occurrences and even emergencies that happen to have an element of predictability. For example, caveat demand profile 206 in FIG. 2A has three entries for three potentially different caveat type events. In this example, events A, B, and C have a start date and an end date with an associated demand level for several hours during this time period. If the start date and end date cover only two days then the demand levels entered in caveat demand profile 206 are used on the start date and end date respectively. When more than two days are covered, the demand levels associated with the start date and end date are used to approximate a demand curve for the time period between the dates bounding the time interval. Class of service entries specified can also be treated in a similar manner. In some situations, class of service remains a constant value over the caveat period while other situations may deem it appropriate to approximate the class of service linearly or with a curve fitted to cover the particular caveat period.

Alternate implementations can organize caveat demand profile 206 in many other ways and may or may not use start and end dates as illustrated in FIG. 2A. For example, events in a caveat demand profile can be specified according to a pattern of dates. This pattern could include specifying particular calendar dates such as, "the last two business days of the month" or "the first Thursday in November." In any event, the time slots, demand values and class of service in caveat demand profile 206 are also combined with demand profile A 202 and demand profile B 204 to create a resulting overall poly-cyclic demand to represent demand for the various resources in the computing facility. Further, caveat demand profile 206 may even hold pointers to replacement demand profiles to be used from the specified start date to end date in lieu of actual profile data.

Figure 2B:
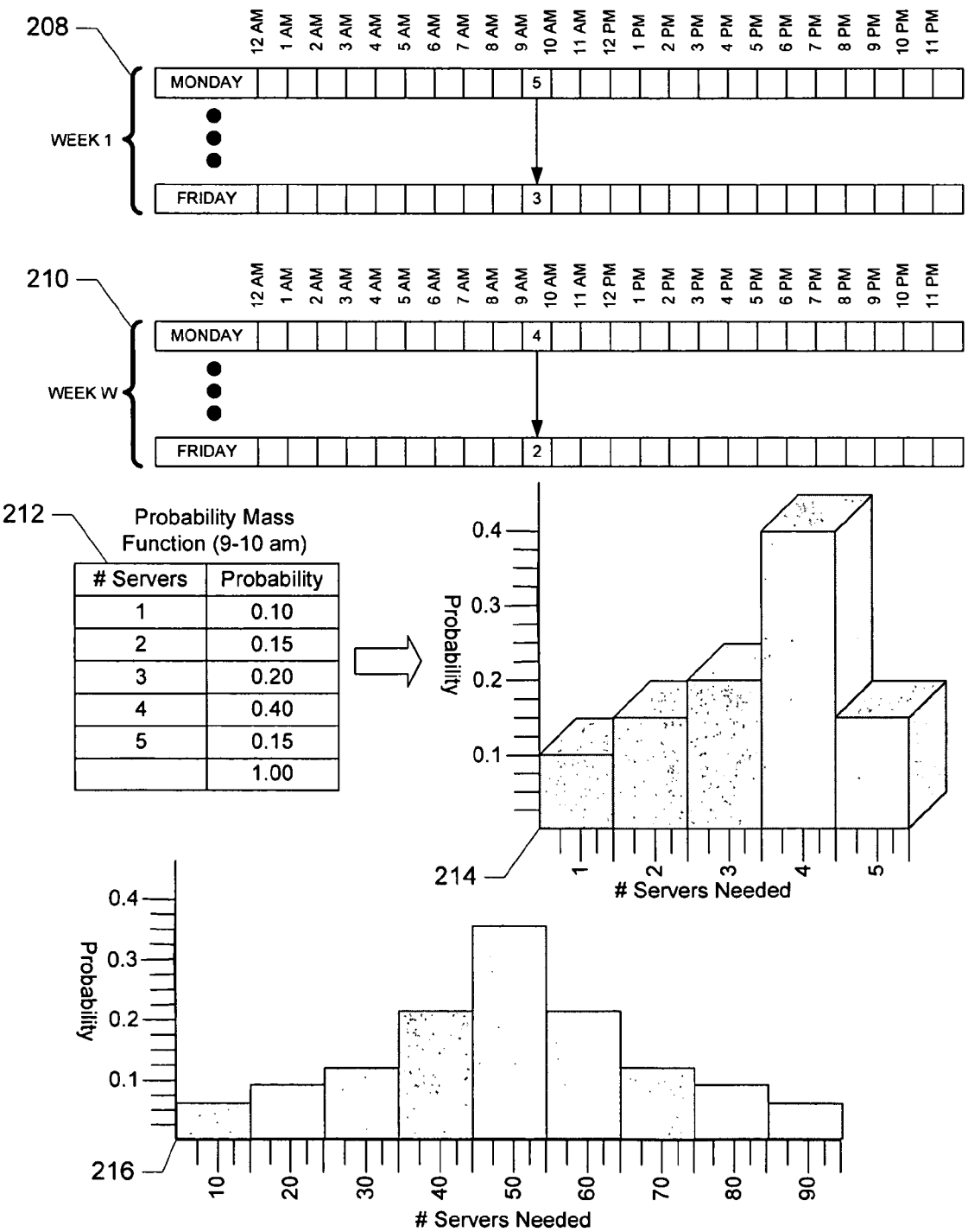
FIG. 2B is a series of block diagrams illustrating a statistical framework for estimating the computing resources needed to satisfy joint application resource demands in accordance with the present invention.

FIG. 2B is a series of block diagrams illustrating a statistical framework for estimating the computing resources needed to satisfy joint application resource demands in accordance with the present invention. Each resource used by an application can be modeled as a demand for the resource during a time slot in a series of time slots over a period of time. While not illustrated explicitly, the demand and associated probabilities for these demands are derived from trace data gathered on the particular application and resources used over various intervals. For example, the hourly demand for a resource over a 24 hour period would be modeled using the historical demand for the resource during a 60-minute time slots t for T=24 or 24 hours. Given a large enough set of historical samples from the application, one can reasonably determine the subsequent probability that an application would require a maximum number of resources in each of the time slots over the time period being measured.

Historical data week 208 through historical data week 210 provide the data for constructing a probability mass function (PMF) from W weeks of data collected during a 9 a.m. to 10 a.m. time slot. In this example, historical data gathered from trace data taken each workday over W weeks for a total of 5 W samples indicates that the application required a minimum of 1 server and a maximum of 5 servers during the time slot being considered. PMF table 212 summarizes this data collected over W weeks as a set of probabilities that the application would need the indicated number of servers with the same results indicated graphically using application bar chart 214. Inherent uncertainty exists in using the PMF for predicting subsequent application resource demands upon the computer utility facility especially when the 5 W or other sample sizes are small. Accordingly, the computing utility facility accounts for this inaccuracy by computing confidence intervals for each of the probabilities in PMF table 212.

An overall utility profile is then obtained for the 9 a.m. to 10 a.m. time frame by performing a similar calculation for each of the applications admitted to using the computer utility facility. The combination of these calculations results in a PMF utility profile 216 to describe the overall resource requirement for servers in the utility. Accuracy of the resulting PMF utility profile 216 affects the computing utility facilities ability to accurately assess and admit different applications with their requests for resources. By increasing the number of observations in creating PMF utility profile 216, the computing utility facility is able to narrow the confidence intervals and thereby increase the accuracy for predicting resource demands. Additional information on determining the resource demands for applications in a computing facility utility is described in the whitepaper, "Statistical Service Assurances for Applications in Utility Grid Environments", by Jerry Rolia, Xiaoyun Zhu, Martin Arlitt, Artur Andrzejak, Internet Systems and Storage Laboratory, HP Laboratories, Palo Alto, HPL-2002-155 Jun. 13, 2002.

Figure 3:
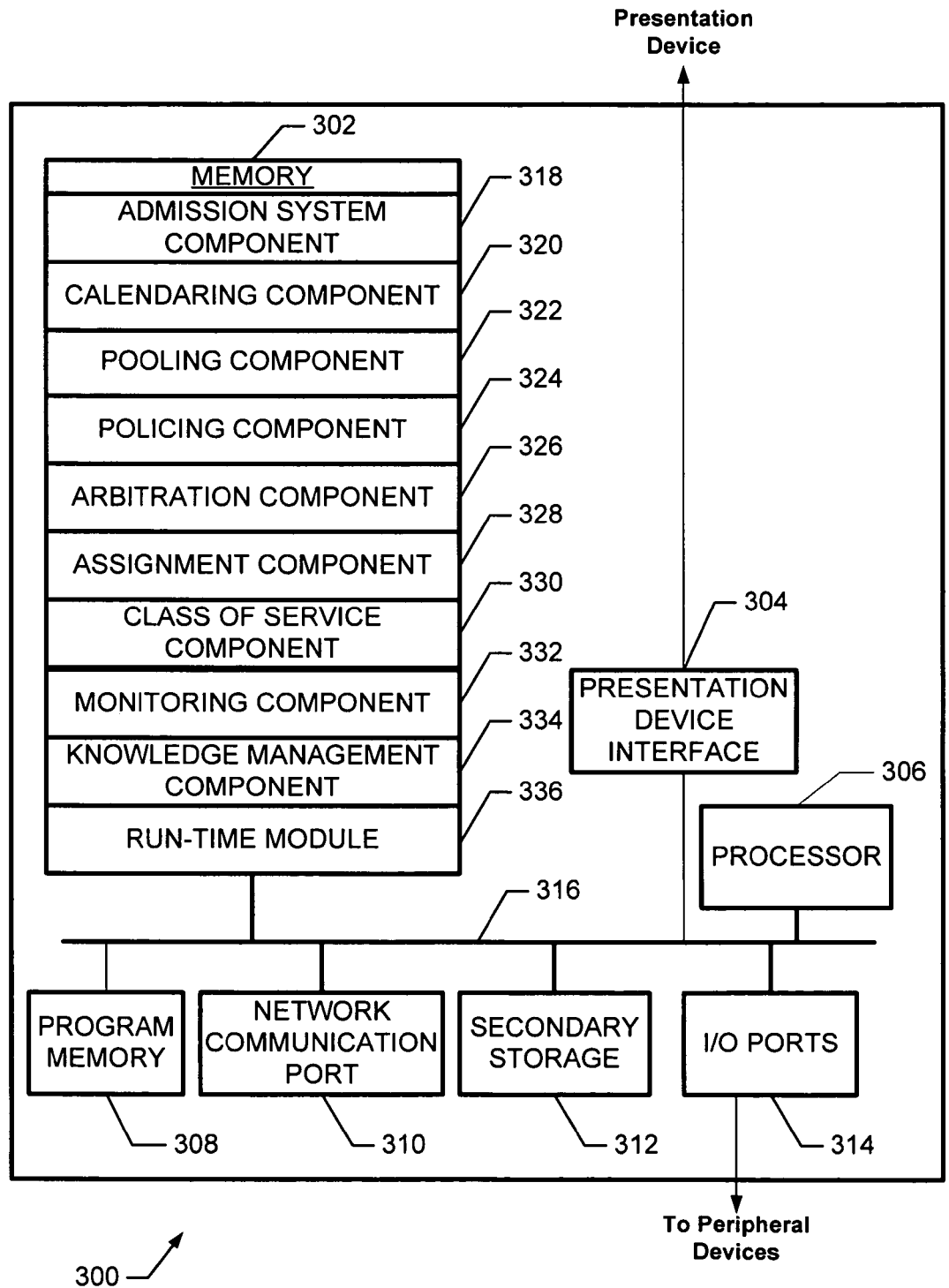
FIG. 3 is a block diagram of a system used in one implementation for performing the apparatus or methods of the present invention.

FIG. 3 is a block diagram of a system 300 used in one implementation for performing the apparatus or methods of the present invention. System 300 includes a memory 302 to hold executing programs (typically random access memory (RAM) or read-only memory (ROM) such as a flash ROM), a presentation device interface 304 capable of interfacing and driving a display or output device, a processor 306, a program memory 308 for holding drivers or other frequently used programs, a network communication port 310 for data communication, a secondary storage 312 with a secondary storage controller and input/output (I/O) ports and controller 314 operatively coupled together over interconnect 316. System 300 can be preprogrammed, in ROM, for example, using field-programmable gate array (FPGA) technology or it can be programmed (and reprogrammed) by loading a program from another source (for example, from a floppy disk, a CD-ROM, or another computer). Also, system 300 can be implemented using customized application specific integrated circuits (ASICs).

In one implementation, memory 302 includes a admission system component 318, a calendaring component 320, a pooling component 322, a policing component 324, an arbitration component 326, an assignment component 328, a class of service component 330, a monitoring component 332, a knowledge management component 334 and a run-time module 336 that manages system resources used when processing one or more of the above components on system 300.

As illustrated, these various modules of the present invention appear in a single computer system. However, alternate implementations could also distribute these components in one or more different computers to accommodate for processing demand, scalability, high-availability and other design constraints. Similarly, components illustrated in FIG. 3 that appear to be discrete and separate from each other could be combined to effectuate higher efficiencies, lower costs or any other design constraint needed to implement aspects of the present invention in a large-scale enterprise or small-scale operating environment. For example, calendaring component 320 and admission component 318 are illustrated as discrete components however it may be more advantageous to combine these components if doing so would increase performance and scalability of the overall system implementation.

Admission system component 318 is responsible for determining if a customer and a given application can be granted admission to use the computing utility facility based on a provided demand profile. Admission system component 318 analyzes both the typical cyclical portions of an application demand profile as well as the caveat driven portions of the demand cycle when making a determination whether to admit or not admit a particular application to the computing utility facility. Details on one implementation of these operations are described in further detail later herein.

Calendaring component 320 maintains one or more calendars used in determining available resources and admitting or not admitting additional applications to the computing utility facility. In one implementation, calendars include time slots corresponding to each hour of usage each day of the week for several years at a time. Alternatively, calendars can track seconds, minutes, weeks, months, or years depending on the granularity required and application requirements. Entries are made on a staging calendar until the application entries are admitted to the computing utility facility and then added to a permanent calendar upon admission. To compartmentalize this information, the staging calendar and permanent calendar can be logically different calendars or alternatively can be the same calendar with a status flag indicating that certain entries in the calendar are tentative or staged while other entries in the calendar are permanent entries. Alternate implementations can arrange tentative and permanent entries in calendaring component 320 in many other ways in addition to those described above.

Pooling component 322 is a component used to organize and present the various resources available to system 300 as one or more resource pools. The resources pooled together may include storage, computing resources, network bandwidth and any other resource being requested by customers running applications. As previously described, these resources can be pooled together based on the type of resource (i.e., pools of storage devices, pools of processors, pools of graphics rendering processors or pools of network nodes), the quality of the resources, (i.e., pools of high-availability devices and medium reliability devices or low-cost devices) or any other logical or physical method of grouping the resources. Alternatively, pools of resources can also be grouped together according to a class of service they are to provide.

Once an application is admitted, policing component 324 ensures subsequent requests for resources from the admitted applications are within an acceptable range according to the application's associated demand profile. Policing component 324 intercepts and rejects requests for resources made outside the acceptable range thus reducing the likelihood that certain resources will become overbooked and/or unavailable. As previously described, class of service does not change the policing function directly but instead affects the way resources are subsequently distributed to applications identified by policing component 324. Further, policing component 324 also considers the entitlement profile and burstiness of an application when performing application level policing functions. Details on policing with respect to entitlements are described in further detail later herein.

Arbitration component 326 intervenes when more than one application is entitled to a limited resource associated with the computing utility facility. To resolve conflict between applications, arbitration component 326 may implement one or more different operations to resolve the contention for the limited resource. For example, arbitration component 326 considers class of service and service level agreements (SLA) to determine a arbitration result that minimizes fines to the computing operation facility. In general, arbitration may be necessary if admission component 318 admits an application that overbooks one or more resource pool.

Once a resource is granted, assignment component 328 performs the necessary tasks and operations to assign the resources from the computing utility facility to a particular application. Assignment component 328 can perform the assignments under one or more different policies. For example, assignment component 328 can assign a first available resource to an application; assign a resource to an application that minimizes the latency for using a particular resource or resources with the application; or assignment component 328 can prioritize the order of assignment according to an application's class of service. Alternatively, assignment component 328 may even defer to a separate assignment module that performs the assignment using a different or proprietary approach to assigning resources.

Class of Service component 330 processes the requested class of service for each of the applications. Applications specifying a class of service typically want to ensure at least a minimum level of processing responsiveness or throughput from a computing facility utility during one or more different dates or time periods. Each class of service provides different degrees of assurance that the performance will occur as scheduled and with the level of efficiency desired. In one implementation, four different types of class of service can be specified including: a static class of service, a guaranteed time varying class of service, a predictable best effort class of service and best effort class of service. Details on these class of service types and their effect on operating the computer utility facility are described in further detail later herein.

Monitoring component 332 creates an audit trail associated with requests to acquire and/or release resources from resource pools and the overall computing utility facility. Detailed data gathering operations programmed into monitoring component 332 create an audit trail with emphasis on facts related to operation of the application in conjunction with a requested resource. For example, monitoring component 332 can specify inclusion of variable length descriptive information, failure cause information and other information useful in analyzing resource distribution, utilization and other interactions with the system.

Knowledge management component 334 is an overall analysis module that exploits information from monitoring component 332 as well as results from other components in system 300. The services provided by knowledge management component 334 include access control to data elements in system 300 and security implementations for system 300. For example, the services provided by knowledge management component 332 include: categorizing applications into different workload classes, maintaining different application profiles automatically, anticipating future application demands for resources in a computing utility facility, and projecting failure rates for certain resources and providing capacity planning scenarios for the operator of the computing utility facility.

Figure 4:
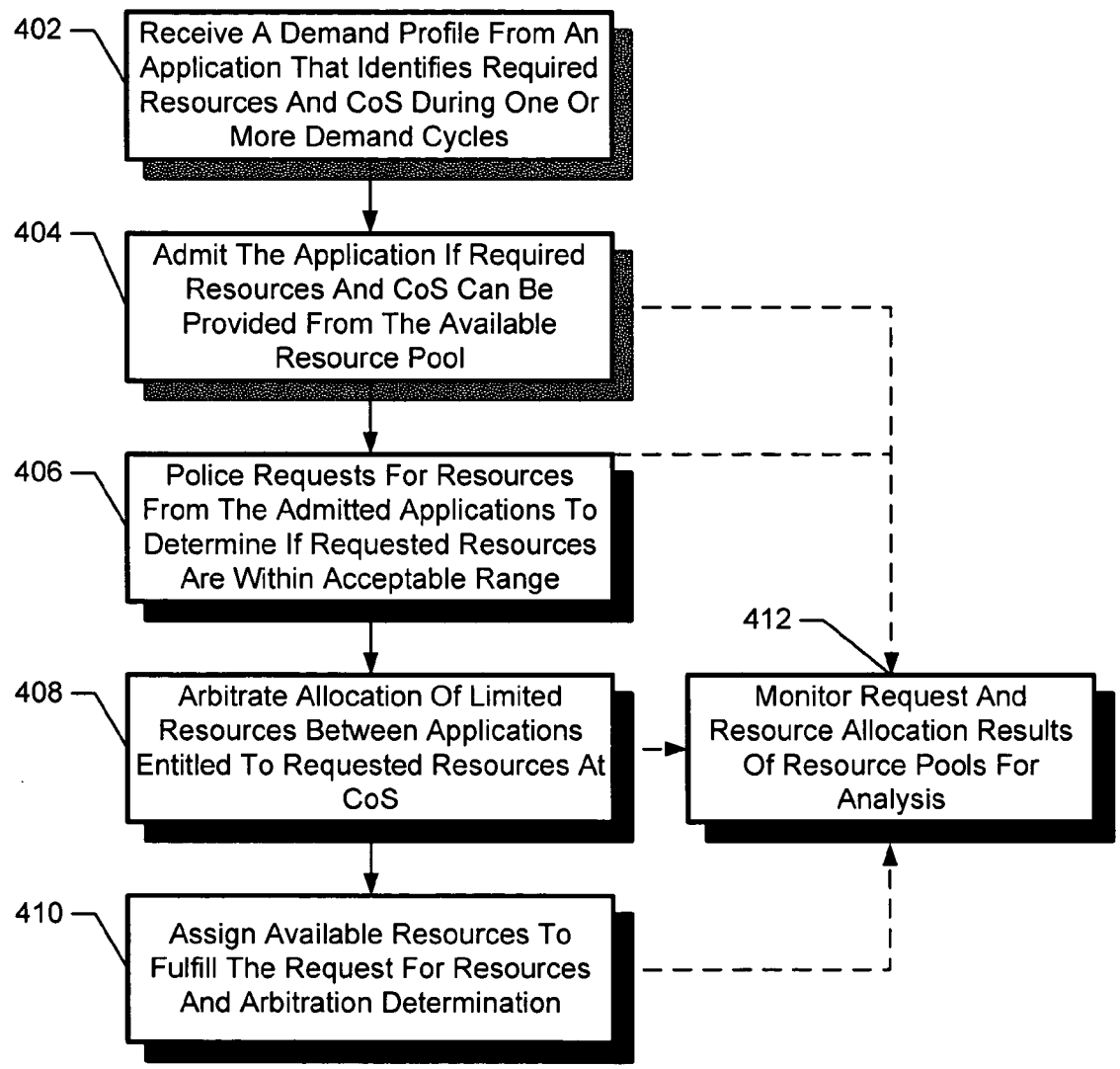
FIG. 4 is a flowchart diagram providing the operations for governing access to resources in a computer utility facility in accordance with one implementation of the present invention.

FIG. 4 is a flowchart diagram providing the operations for governing access to resources in a computer utility facility in accordance with one implementation of the present invention. Initially, a customer submits a demand profile associated with an application that identifies a class of service and the resources required during one or more demand cycles (402). The demand profile optionally also includes underlying raw trace data used to derive the entries in the demand profile. As previously described, implementations of the present invention use the demand profiles to create a poly-cyclic demand for resources delivered with a class of service, manage any overbooking of resources and ensure the availability of resources. Class of service information is also used later when resources are in contention and implementations of the present invention need additional criteria for prioritizing their distribution.

In one implementation, the demand profiles can be created empirically through data collection or through various statistical estimation methodologies. For example, the demand profile for one application can include many smaller demand profiles corresponding to different time periods or other cycles of operation used by the application. Because business applications are often running applications continuously, there may be one demand cycle associated with demand during the week and another demand cycle associated with demand by the application on weekends or other period when the activity is reduced or lessened. Class of service requirements may also vary according to financial or other incentives for running a particular application with a higher degree of efficiency and performance during one time period compared with another time period. For example, a business may request a higher class of performance when customers running an application cannot afford to receive slow or poor performance. If performance is critical, these customers may even be willing to pay a premium in exchange for a more responsive computing facility as specified through an SLA or other contractual obligation.

Alternatively, if cyclic profiles are not known in advance, an application requesting resources may allow implementations of the present invention identify the appropriate demand cycles. For example, monitoring and knowledge management components can be used to learn and report on demand cycles and class of service for one or more applications. This information can be used directly or indirectly to then generate demand profiles useful in subsequent resource reservation requests.

Once the demand profiles are provided or derived, implementations of the present invention then admit the application if required resources and class of service can be provided from an available resource pool (404). The admission process involves comparing the one or more time demand cycles making up the poly-cyclic demand for a resource with the availability of the resource. To meet class of service requirements, these resources must be delivered to the application with at least the level of service specified. In one implementation, statistical analysis is used to project this information and determine if admitting the application and fulfilling the projected corresponding demand and class of service is feasible in light of demand profiles from the other already admitted applications. The utility can optionally provide a higher or more desirable class of service but depending on the agreement may not be able to charge additional fees. Further details on the admission process using class of service considerations are described in further detail later herein.

To further manage potential overbooking, implementations of the present invention may also police requests for resources from the admitted applications to determine if requested resources are within an acceptable range (406). Before admission, applications provide a demand profile based upon an expected usage of one or more resources while executing an application over a period of time. The demand profile also includes the minimum required class of service specified by the application as previously described. While running business applications and other applications continuously or for long time periods, it is possible that an application may attempt to exceed the boundaries corresponding to the demand profile initially provided by the application upon admission to the computing utility facility. Accordingly, policing individual requests from applications as these applications run helps ensure these applications do not exceed the expected resource usage as specified and used as the basis for their admission. Details on policing operations are described later herein.

Despite these attempts to avoid a conflict, occasionally it may be necessary to arbitrate which applications are entitled to a requested but limited resource (408). Arbitration implemented in accordance with the present invention may be required to provide the resource to one application and deny the resource to other applications contending for the same resource and/or class of service. Consequently, arbitration takes into account the contracted class of service and the corresponding pricing penalties paid by the computing utility facility when the class of service and resource requirements is not met. Further details on the arbitration operations in light of class of service are also described in further detail later herein. Once the applications request is processed as described, implementations of the present invention assign the available resources to fulfill the request (410). The resource is released from the application once the request is fulfilled and can be reassigned at a later point in time.

Together the results from the admission, policing, arbitration and other operations are monitored and kept for later analysis (412). The audit trail developed during the monitoring stages assists in understanding the allocation of resources, the request and release of certain resources along with the outcome of each request for resources. For example, the monitoring can track if an application requesting a resource becomes entitled to the resource or is rejected; further monitoring can also reveal details on the resource selected and assigned to an application. These results can be passed directly to the knowledge management component of the present invention or archived for subsequent analysis.

Figure 5:
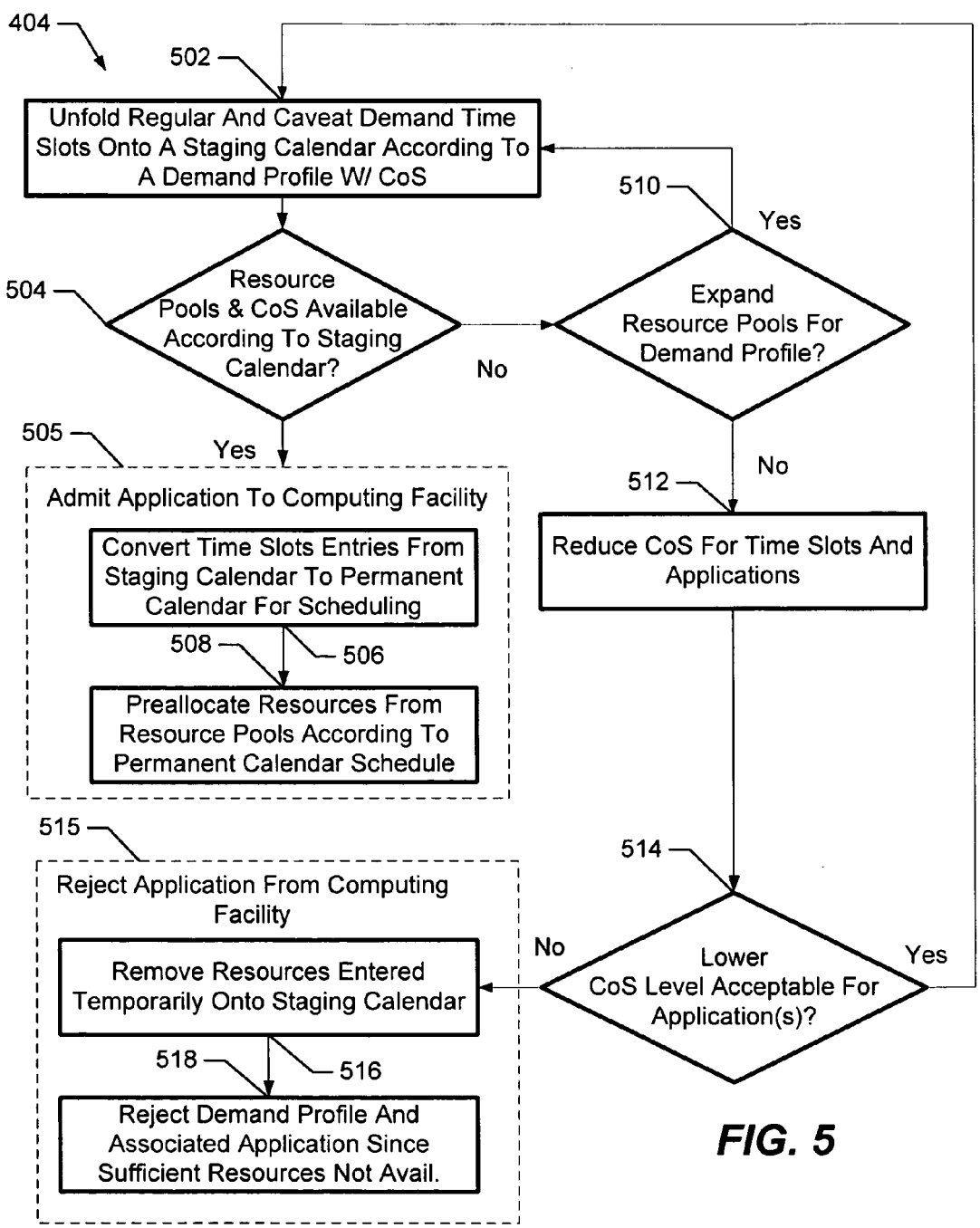
FIG. 5 is a flowchart diagram of the operations that combine the multiple demand profiles and class of service requirements in accordance with one implementation of the present invention.

FIG. 5 is a flowchart diagram of the operations that combine the multiple demand profiles and class of service requirements in accordance with one implementation of the present invention. This flowchart diagram in FIG. 5 further describes step 404 from FIG. 4. These operations capture both poly-cyclic demand and class of service requirements for an application running continuously or over a long period of time within a computing utility environment.

Initially, implementations of the present invention unfold regular and caveat demand time slots onto a staging calendar according to the submitted demand profiles and class of service requirements (502). Regular demand time slots generally reoccur on a relatively short time frame while caveat demand time slots occur over much longer periods of times. For example, one set of demand time slots used by an application may repeat during the week while another set of demand time slots occur with a certain demand on the weekends. More occasional events including sporting events or certain holidays can be predicted by entering a demand for resources using the caveat demand time slot. Together, the various types of demand occur at a particular cycle creating the poly-cyclic behavior associated with the application.

Class of service requirements specify the minimum desired level of service an application will accept when receiving a particular requested resource. In one implementation, the demand for the requested resources may be associated with one or more different classes of service in either a static or a time varying manner. These particular classes of service include: (1) a static service delivered by the computing utility at a constant level that does not vary based on time of day or other factors (2) guaranteed time varying service delivered by the computing utility that guarantees (i.e., 100% assurance) access to a certain number of resources according to the particular time slot (3) predictable best effort (PBE) class of service delivered by the computing utility that provides a certain probability or assurance rather than a guarantee (i.e., something less than 100% assurance) that a certain number of resources will be available at the particular probability (4) best effort service delivered by the computing utility that provides resources on an as available basis only; in some cases, the computing utility may even require some previously allocated resources to be returned to the utility on demand when an entitlement is exceeded or at any point in time when a best effort allocation is made. Further details on the various class of service types are described in further detail later herein.

In an alternate implementation, calendar based caveats may also be used to vary the particular class of service requirements associated with a resource in a demand profile. These calendar-based caveats allow a demand profile to occasionally also modify the class of service requirements without changing the overall general scheme. For example, an application can specify a first class of service (class of service A) in the demand profile each day of the week with the exception that a second class of service (class of service B) is required on Tuesdays between 2 pm and 4 pm. These caveats allow an application to specify a different class of service on an occasional basis as exceptions to normal service and demand requirements occur.

Each of the above implementations unfolds both the regular and caveat based demand profiles onto a staging calendar. The staging calendar is used to determine if the pool of resources associated with the computing utility facility is able to provide the required resources and class of service requested by the application (504). Resource pools associated with the computing utility facility are probed to determine if the request made by an application can be fulfilled at both the time slot and the minimum desired class of service.

Admission operations of the present invention compute whether the sum of resource of requirements for all applications across multiple class of service can be supported (505). In one implementation, the admission operation computes the resources and multiple class of service required by all applications. Calculating the demand for resources and multiple classes of service together allows more sharing between applications and available resources. This enables a computing utility to achieve a higher asset utilization of its resource pools through a more careful allocation of the underlying resources.

In an alternate implementation, the computing utility does not make an aggregate determination but instead adds the separate demand and class of service requirements for each individual application. This approach may be easier to implement yet is likely to require more resources than the aggregate solution. Fulfilling individual requests tends to utilize more resources as sharing of excess resources between applications is less likely to occur. For example, this alternate approach could require reserving a separate sub-pool of resources for each application. Consequently, it may only be possible to implement this latter approach using static and guaranteed class of service.

If the resources are available, implementations of the present invention admit an application to the computing utility for further processing (505). In one implementation, this first involves converting time slot entries from staging calendar to the permanent calendar for scheduling (506). This conversion can be done by keeping separate staging and permanent calendars or merely changing the status of a time slot entry from being staged or temporary to permanent when the scheduling is complete. Optionally, the present invention can then preallocate resources from the resource pools at the required level of assurance (i.e., class of service) according to entries in the permanent calendar schedule (508). This latter step would additionally make sure the resources do not subsequently appear available due to race conditions or other applications being processed in parallel by the computing utility.

Alternatively, if the resources in the resource pools are not available then it may be possible to accommodate the demand profile by expanding the resource pools to include additional resources (510). Once the additional resources are added to the pool then the demand profile and associated class of service requirements are compared again to available resources (502).

When no additional resources can be added, the computing utility designed in accordance with implementations of the present invention attempts to fulfill the request by proposing to reduce the class of service for one or more time slots and applications (512). In one implementation, class of service is reduced for the time slots and applications unable to receive the requested service and gain admission to the computing facility. Alternatively, the class of service (CoS) is reduced for different applications across the operating platform and is not limited to the former set of applications not already admitted to the computing facility.

In either case, the application can specify a minimum desired class of service directly in the demand profile based on the level of performance desired by the application. Implementations of the present invention confirm that the class of service reduction proposed by the utility is acceptable by the one or more applications (514). In one implementation, the application can accept or reject the proposed reduction in class of service through a real-time interface used to admit the application into the computing utility. Alternatively, the application may decide in advance what reductions in class of service and terms and conditions are acceptable or unacceptable. Terms and conditions affected by the proposed reduction in class depend on the particular SLA associated with the application. In some cases, the computing utility would suffer a penalty for reducing the class of service while in other cases a reduction in the class of service would reduce the fees for using the computing utility by the application without imposing additional penalties on the utility. In general, implementations of the present invention would consider the various financial arrangements specified in each application's SLA and attempt to maximize revenue to the utility by minimizing overall penalties and fee reductions.

In the event the proposed lower class of service is not accepted, implementations of the present invention would reject one or more applications from computing facility (515). Based on the illustrated implementation, this would involve removing requested resources, if any, entered temporarily onto the staging calendar from the demand profile (516) in preparation for subsequent operations. This would be followed by then rejecting the demand profile and associated application as the resources and requested class of service are not available (518).

Figure 6:
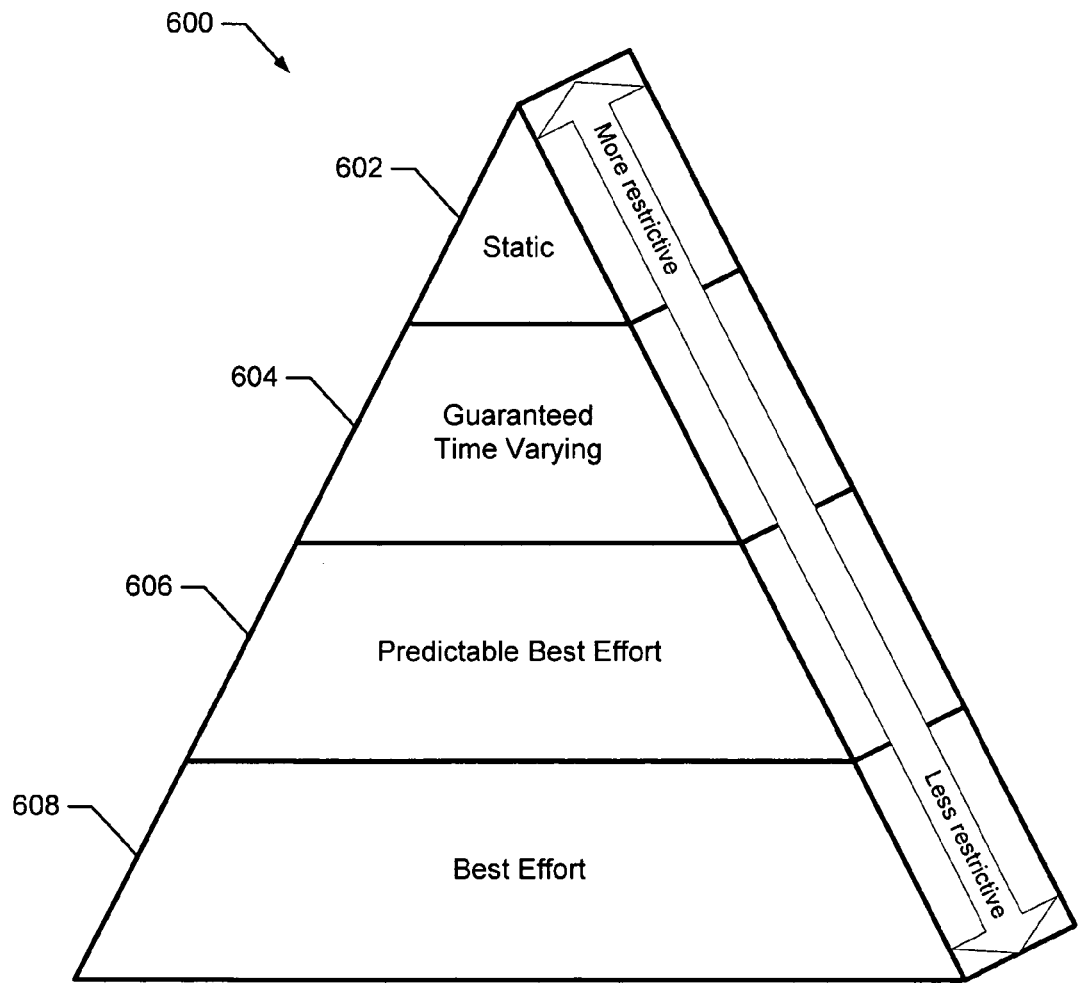
FIG. 6 is a schematic diagram illustrating the one or more class of service used in accordance with one implementations of the present invention.

FIG. 6 is a schematic diagram illustrating the one or more class of service used in accordance with one implementations of the present invention. As previously described, these classes of service 600 includes: (1) a static service delivered by the computing utility at a constant level that does not vary based on time of day or other factors (2) guaranteed time varying service delivered by the computing utility that guarantees (i.e., 100% assurance) access to a certain number of resources according to the particular time slot (3) predictable best effort (PBE) class of service delivered by the computing utility that provides a certain probability or assurance rather than a guarantee (i.e., something less than 100% assurance) that a certain number of resources will be available at the particular probability (4) best effort service delivered by the computing utility that provides resources on an as available basis only; in some cases, the computing utility may even require some previously allocated resources to be returned to the utility on demand when an entitlement is exceeded or at any point in time when a best effort allocation is made. Further details on the various class of service types are described in further detail later herein.

In this example, classes of service 600 arrange the different classes in a pyramid to illustrate a hierarchical arrangement for modifying the class of service. In one implementation, an increase in the class of service goes from best effort 608 to predictable best effort 606 to guaranteed time varying 604 and to static 602. Conversely, a decrease in the class of service goes from static 602 to guaranteed time varying 604 to predictable best effort 606 and then to best effort 608. As class of service increases, the performance requirements on the computing utility are more restrictive and less variation in service is tolerated. In comparison, decreasing the class of service is necessarily accompanied by more tolerance or variation. For example, a predictable best effort (PBE) 606 class of service can be specified in accordance within different levels of assurance, for example, ranging from PBE-0.9 to PBE-0.99999.

Figure 7:
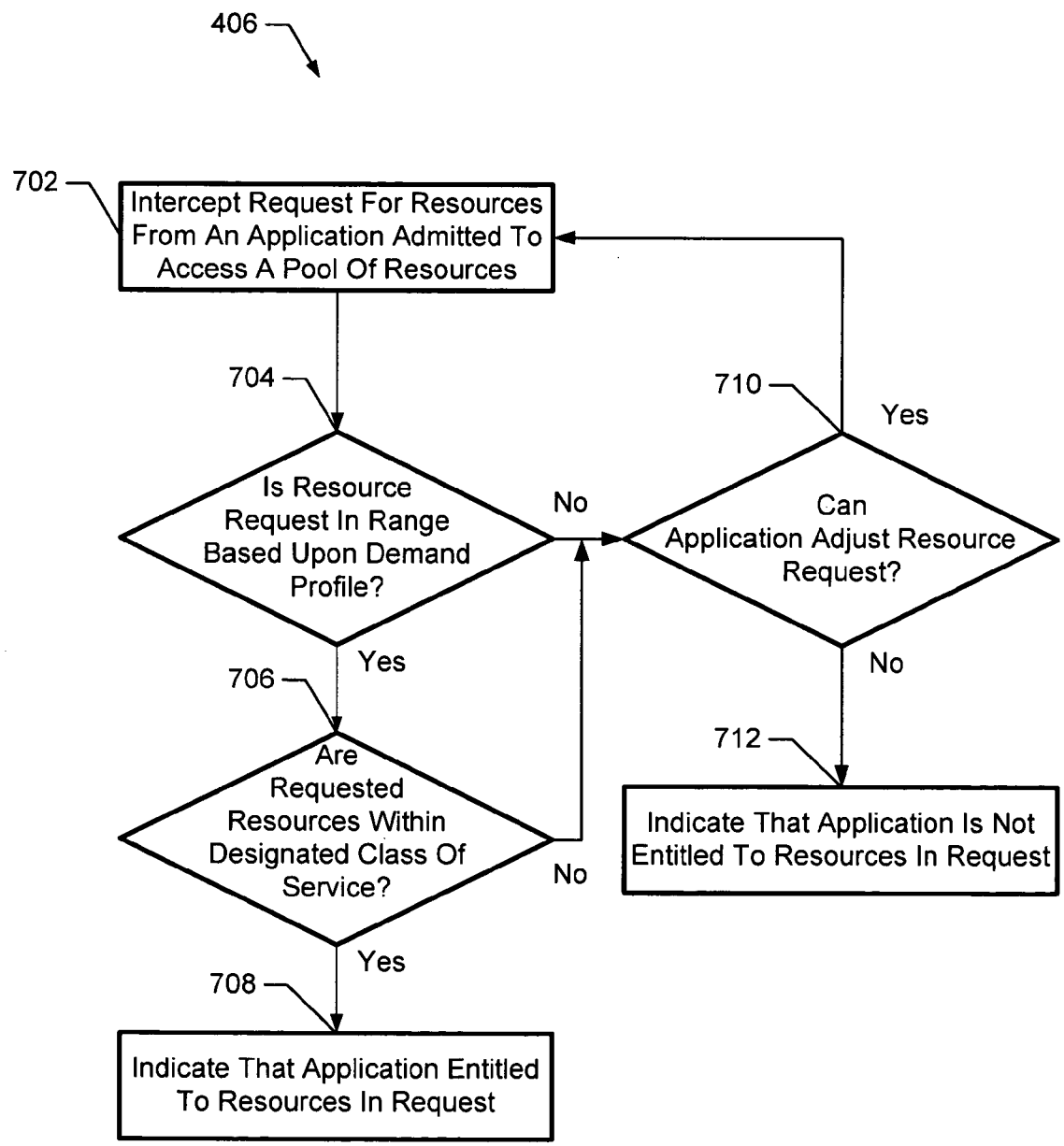
FIG. 7 is a flowchart diagram of the operations used to police requests for resources from admitted applications in one implementation of the present invention.

FIG. 7 is a flowchart diagram of the operations used to police requests 406 for resources from admitted applications in one implementation of the present invention. Initially, the policing intercepts all requests for resources from applications admitted to access a pool of resources (702). The policing operations check that a resource request is within a tolerable range considering the demand profile for the application (704). These policing operations consider the quantity of resources requested in light of the expected burstiness of the application. Details on the entitlement profiles and the computing utility evaluation of an application's burstiness are described in further detail later herein.

Optionally, policing operations may also confirm that the requested resources are within the expected or designated class of service associated with the application (706). If the application request for a resource is within the tolerable range for the demand profile and class of service then an indication is provided that the application is entitled to the requested resources (708).

Alternatively, in the event the request is outside of the demand profile or expected class of service for the application, a request is made to the application to adjust the request for resources (710) and try once again. Implementations of the present invention provide an indication to applications unable to adjust their request for resources that they are not entitled to the requested resources (712).

Figure 8:
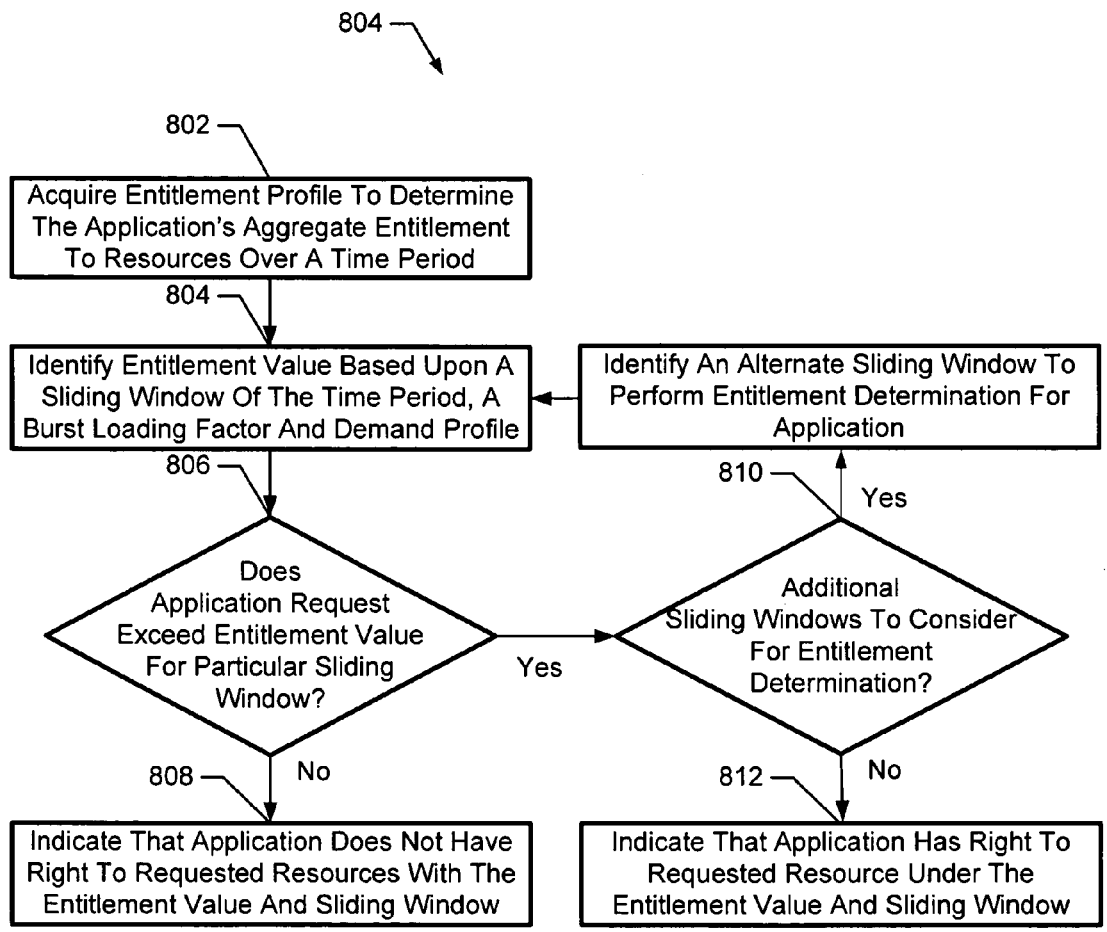
FIG. 8 is a flowchart diagram further detailing one implementation of the present invention for policing of requests for resources by one or more applications.

FIG. 8 is a flowchart diagram further detailing one implementation of the present invention for policing of requests for resources by one or more applications. In particular these operations describe the policing operations for checking that a resource request is within a tolerable range 704 as illustrated and described previously with respect to FIG. 7.

In this implementation, the policing operation of the present invention acquires an entitlement profile to determine the application's actual entitlement to a resource (802). Policing generally helps monitor resource usage on the computing facility and recapture costs when the resource requests exceed the computing utilities expected demand for the particular application. The entitlement profile is a negotiated set of parameters and, in certain cases, operating procedures for dealing with the operational and financial consequences of these types of demands. This is necessary in the event one or more applications experience a sudden demand for resources outside the nominal demand profile provided upon admittance to the computing utility facility.

Typically, the entitlement profile is negotiated along with the SLA when the applications are analyzed and admitted to the computing utility facility. As previously described, the entitlement profile augments the overall demand profile associated with each application and provides a more detailed operational characteristics of the application. In one aspect, the entitlement profile facilitates characterizing the burstiness of the application given different periods or windows of time. To derive this information, one implementation of the present invention analyzes and uses detailed trace data reflecting historical operation of the application and use of resources in various time periods or windows as described and used later herein.

With the entitlement profile, the policing operation identifies an entitlement value based upon a sliding window over a portion of the aggregate time, a burst loading factor and the demand profile (804). The entitlement value serves as a metric for determining whether a particular application is entitled to the requested resources in the particular window. The entitlement value is proportional to the burst loading factor and the past resource usage derived from historical trace data for the application. If the application is very erratic or bursty in the given window size, the burst loading factor is large to allow the application to make larger requests during the particular time window. Conversely, if the application resource usage is relatively constant and not as bursty then a smaller burst loading factor is used thus limiting the size of requests in the particular window.

For example, the entitlement value determination typically selects a sliding window size (W) that is a fraction of the aggregate time period (T) during which an aggregate entitlement of the resources (D) exists. The burst loading factor is determined for each window size and provides a historical measure of the application's tendency to be bursty during this particular interval. During a sliding window (W) of approximately ½ T, a very bursty application may have an 80% burst loading factor and be entitled make a request up to 80% of D during W. However, the less bursty application during the same sliding window (W) of approximately ½ T would have a 60% burst loading factor instead allowing them to make requests of only 60% of D during window W. On the computing utility side, the more bursty applications having the higher burst loading factor would generally be more costly to run as they typically require more resources.

Next, the policing operation determines whether the actual request for resource exceeds entitlement value for the particular sliding window (806). Each request is checked against a sliding window size and entitlement values to help ensure the application does not exceed the projected amount of resources made available to the application. Different windows sizes and corresponding entitlement values are processed in this manner to cover different possible patterns of resource usage during the overall aggregate time period (T).

As previously described, the entitlement value can be derived in part from the trade data and information in the demand profile values submitted with the application. As a refinement, the accuracy of the entitlement value is further evaluated in consideration of a confidence interval that bounds the actual entitlement value calculated. This confidence interval helps the computing utility facility determine when the resource request should be fulfilled or denied. When the number of samples provided in the demand profile is large and/or the application demand data is very accurate then the confidence interval is relatively small and the entitlement value is more reliable. Conversely, fewer samples in the demand profile of the application would result in a much larger confidence interval. Larger confidence intervals allows the computing utility to reject a resource request more readily as the entitlement values calculated are inherently less accurate (i.e., could be larger or smaller). This helps the computing utility reject resource requests falling outside the confidence interval without suffering SLA, contractual or other penalties for doing so.

The application's request for resources is not granted when the request exceeds the entitlement value in view of the sliding window (808). In general, the policing operation denies the request for resources if any one of the different window size and entitlement value combinations should deny the request for resources. For example, if the request exceeds the entitlement value associated with a window (W) of size ½ T the request is denied even if a previous comparison against an entitlement value for a window (W) of size ¾ T allowed the request.

At least two events may occur when the computing utility facility does not fulfill the application's request for resources. In one case, the resource requested is denied or throttled. This means the application is not granted the request and must perform the subsequent operations without additional resources as requested. Alternatively, the computing utility facility may also determine that the application has a resource but has utilized the resource for a period of time exceeding the time period contemplated by the utility when the resource was originally granted. In this latter case, the computing utility facility would reclaim or "clawback" the previously granted resource due to the application not returning the resource on it's own accord. This clawback operation has no negative financial impact on the utility as the application has exceeded the usage period; in some cases the clawback operation may actually result in additional fees to the computing utility facility and depends on the particular SLA or contractual arrangement associated with the application.

Alternatively, the policing operation compares the request against additional sliding windows and entitlement values if prior entitlement values do not serve to deny the requested resource (810). The number of sliding windows used to qualify the entitlement depends on the implementation of the policing function of the present invention. In some cases, only two entitlement value and sliding window sizes are used for the determination before the application receives indication and is granted right to the requested resource (812). For example, a first sliding window (W) of size T is used and a second sliding window of approximately ½ T is used for purposes of policing the requests. In other cases, the policing operation identifies several additional or alternate sliding window and entitlement value combinations (814) and iteratively repeats the above operations until completion.

Figure 9:
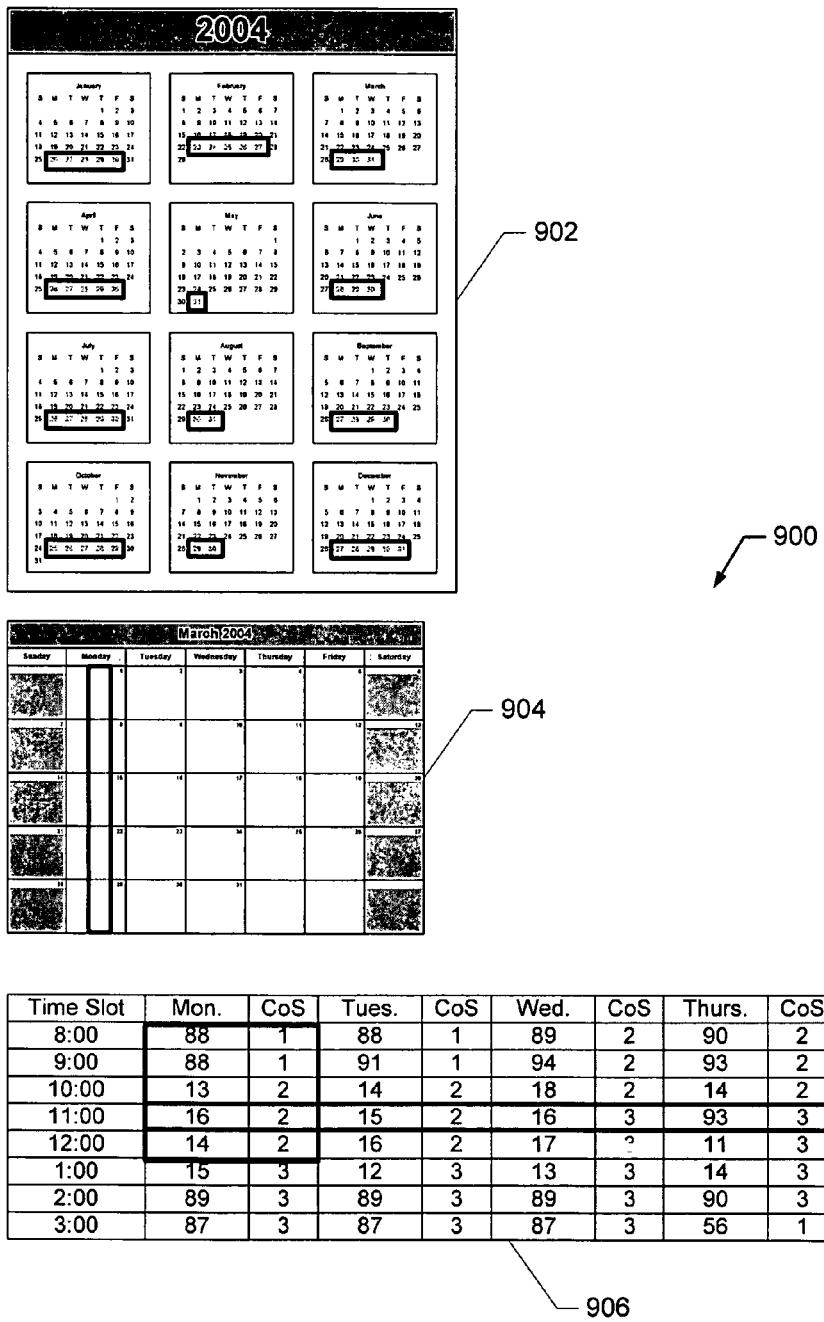
FIG. 9 is a schematic diagram of various time periods and sliding windows used to determine an entitlement value in accordance with implementations of the present invention.

FIG. 9 is a schematic diagram of various time periods and sliding windows used to determine an entitlement value in accordance with implementations of the present invention. In this diagram, sliding windows are illustrated in the context of an annual calendar 902, a month calendar 904 and a weekly calendar 906. By way of example, this diagram illustrates examples of different sliding windows used to allocate resources to applications. These various sliding window examples may span various time intervals and depends on the terms negotiated between the computing facility utility and the application. In this example, annual calendar 902 highlights a set of intermittent sliding windows that occur on the last work week of each month. Month calendar 904 illustrates an intermittent type of sliding window that covers a time interval occurring the first work day in each week. The sliding window on weekly calendar 906 provides both a contiguous entitlement window covering several hours on particular workday and an intermittent entitlement window covering the same time interval for each day in a work week.

Figure 10:
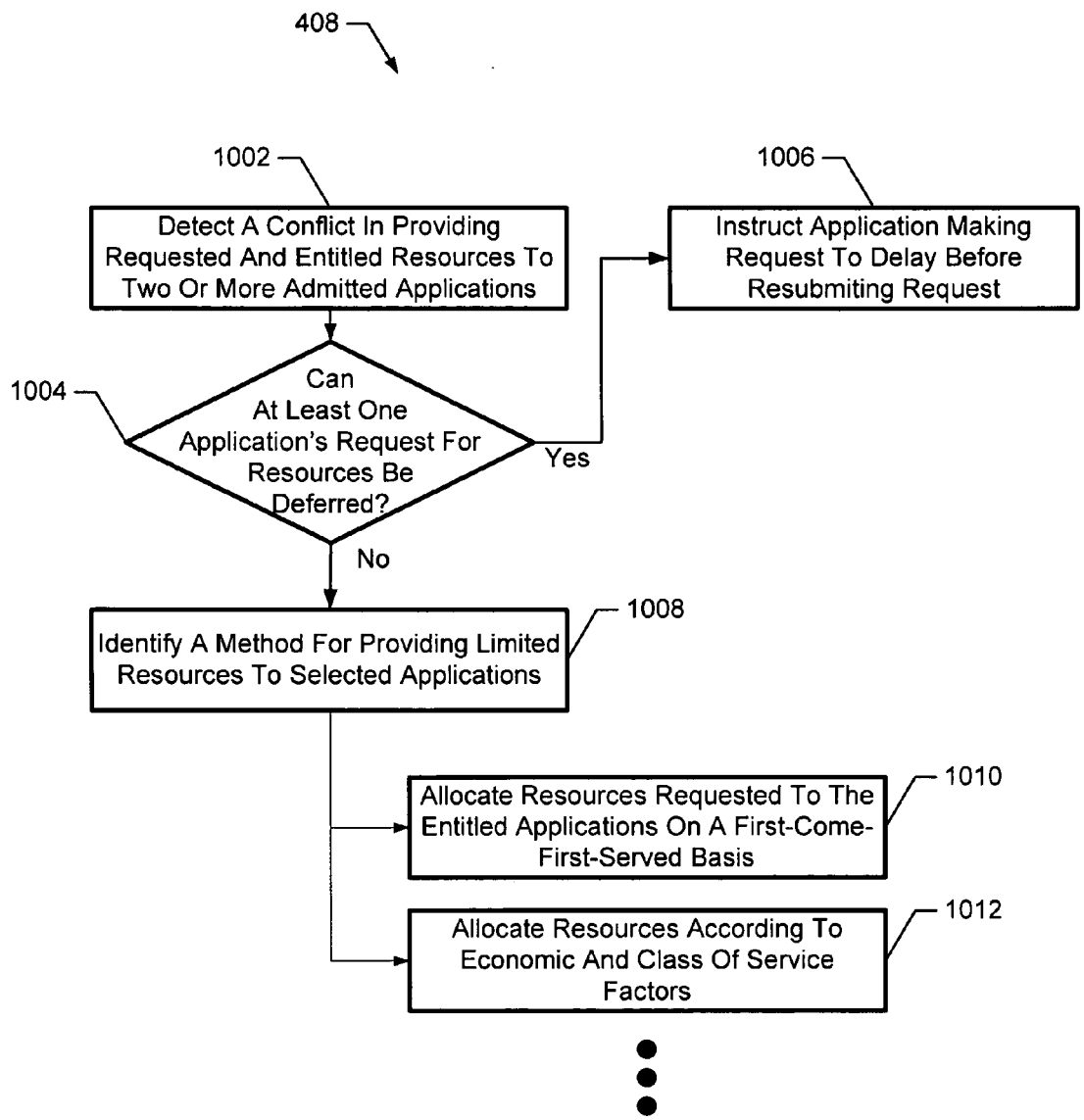
FIG. 10 is flowchart diagram detailing the operations for arbitration of resources in accordance with one implementation of the present invention.

FIG. 10 is flowchart diagram detailing the operations for arbitration of resources 408 in accordance with one implementation of the present invention. As previously described, some cases may arise where multiple applications admitted to the computing utility facility have contention for one or more of the same resources. In one implementation, the present invention detects a conflict in providing requested resources to two or more admitted applications both ostensibly entitled to the resources (1002). Each of the applications is entitled to the resources as they have made a request within their respective demand profile, class of service and entitlement profile. However, the requested resource is in limited supply and cannot be assigned to both applications without causing a conflict or contention.

To resolve this dilemma, one implementation of the present invention determines if at least one application's request for resources can be deferred until a later time (1004). In one implementation, deferring the application has no operational impact on the application and does not cause the computing facility to lose revenue or incur any penalties directly or indirectly for deferring the selected application. The selected application is then instructed to delay a random period of time before resubmitting the request for the resources thereby allowing another application to receive the resource requested (1006).

If no application can readily defer the request for resources, an alternative solution identifies a method for providing the limited resources to only selected applications (1008). In one implementation, the requested resources in contention are allocated to the entitled applications on a first-come-first-served basis (1010). Yet another implementation allocates resources according to economic and class of service factors (1012).

In one implementation, the present invention selects the allocation of resources in a manner that minimizes penalties and financial loss to the computing facility. This operation involves comparing the class of service associated with one or more applications and the associated penalties specified in the application's corresponding contract or SLA. For example, an application with a static class of service specified in the SLA may generate larger penalties against the computing facility than a similar application operating on a best efforts class of service. Accordingly, one implementation would rank the two or more admitted applications entitled to receive the limited resources according to potential economic penalties imposed upon the computing utility facility.

Based upon this ranking, the present invention would select one or more admitted applications to not receive the limited resources in order to minimize the economic penalty to the computing utility facility. For example, the class of service and corresponding SLA would influence implementations of the present invention to favor providing the resources to the application with the higher class of service (e.g., the static class of service) over the lower class of service (e.g., the best effort class of service). Of course while this is only an example, alternate implementations using different classes of service and terms and conditions in the SLA or other contractual arrangement would also be driven by minimizing loss or maximizing gain to the computing facility and therefore operate in a similar manner.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. For example, tables are provided describing one or more demand cycles for a particular resource or pool of resources however the values in these tables are only examples and the organization and scope of information is intentionally limited to illustrate the example. In practice, demand information and corresponding resources could be contained in many tables or databases and may include many details about the resources, class of service, the demand cycles and other demand details. Accordingly, the invention is not limited to the above-described implementations, but instead is defined by the appended claims in light of their full scope of equivalents.

What is claimed is:

1. A method of policing resources in a computing utility facility, comprising:

intercepting, by a processor, a request for an amount of resources from an application admitted to access a pool of resources associated with the computing utility facility and prior to utilization of the pool of resources to execute the application;

acquiring an entitlement profile associated with the application to determine if the application is entitled to the requested amount of resources over a time period;

identifying an entitlement value and corresponding sliding window of the time period from the entitlement profile, wherein the entitlement profile associated with the application describes burstiness of the application over the time period, and the burstiness includes a measure of the application's expected bursts for resources;

determining if the requested amount of resources exceeds the entitlement value associated with the sliding window;

if the requested amount of resources does not exceed the entitlement value associated with the sliding window, indicating that the application is entitled to the requested amount of resources; or if the requested amount of resources exceeds the entitlement value associated with the sliding window, in accordance with the entitlement profile, acquiring additional sliding windows and corresponding additional entitlement values to determine if the requested amount of resources exceeds the additional entitlement values, and indicating that the application is not entitled to the requested amount of resources when the requested amount of resources exceeds the additional entitlement values or indicating that the application is entitled to the requested amount of resources when the requested amount of resources does not exceed the additional entitlement values.

2. The method of claim 1 wherein a burst loading factor associated with each sliding window corresponds to the burstiness of the application and identifies a portion of an aggregate entitlement to the resources available to fulfill the request.

3. The method of claim 2 wherein a larger burst loading factor is associated with more bursty applications that may need resources more rapidly compared with a smaller burst loading factor associated with applications that may not need resources as rapidly.

4. The method of claim 1 wherein the entitlement value is derived from historical trace information collected while the application is using resources.

5. The method of claim 1 wherein the burst loading factor is derived from the historical trace information collected while the application is using resources.

6. The method of claim 1 wherein the pool of resources associated with the computing utility facility is determined according to an estimated probability mass function.

7. The method of claim 6 wherein the estimated probability mass function further includes a confidence interval corresponding to a sample size used for determining the estimated probability mass function.

8. The method of claim 1 wherein the entitlement value operates as a metric for determining whether an application is entitled to the requested resources.

9. The method of claim 8 wherein the entitlement value for an application is proportional to the burstiness of the application in view of resource usage derived from historical trace data.

10. The method of claim 1 wherein the determining of if the requested amount of resources exceeds the entitlement value comprises:

determining if the requested amount of resources exceeds the entitlement value depending on a confidence interval associated with the entitlement value and the number of sample values used to identify the entitlement value.

11. The method of claim 1 comprising:

if the requested amount of resources exceeds the entitlement value associated with the sliding window, clawing back of resources already allocated to the application when the application has exceeded a time limit for using the allocated resources.

12. The method of claim 1, the method further comprising:

in response to the requested amount of resources exceeding the entitlement value associated with the sliding window, implementing a throttling of access to the pool of resources associated with the computing utility facility by the application.

13. An apparatus for policing resources in a computing utility facility, comprising:

a processor;

a memory containing instructions that when executed cause the processor to:

intercept a request for an amount of resources from an application admitted to access a pool of resources associated with the computing utility facility and prior to utilization of the pool of resources to execute the application, acquire an entitlement profile associated with the application to determine if application is entitled to the requested amount of resources over a time period, identify an entitlement value and corresponding sliding window of the time period from the entitlement profile, wherein the entitlement profile associated with the application describes burstiness of the application over the time period, and the burstiness includes a measure of the application's expected bursts for resources, determine if the requested amount of resources exceeds the entitlement value associated with the sliding window, if the requested amount of resources does not exceed the entitlement value associated with the sliding window, indicate that the application is entitled to the requested amount of resources, or if the requested amount of resources exceeds the entitlement value associated with the sliding window, in accordance with the entitlement profile, acquire additional sliding windows and corresponding additional entitlement values to determine if the requested amount of resources exceeds the additional entitlement values and indicate that the application is not entitled to the requested amount of resources when the requested amount of resources exceeds the additional entitlement values or indicate that the application is entitled to the requested amount of resources when the requested amount of resources does not exceed the additional entitlement values.

14. The apparatus of claim 13 wherein a burst loading factor associated with each sliding window corresponds to the burstiness of the application and identifies a portion of an aggregate entitlement to the resources available to fulfill the request.

15. The apparatus of claim 14 wherein a larger burst loading factor is associated with more bursty applications that may need resources more rapidly compared with a smaller burst loading factor associated with applications that may not need resources as rapidly.

16. The apparatus of claim 13 wherein the entitlement value is derived from historical trace information collected while the application is using resources.

17. The apparatus of claim 13 wherein the burst loading factor is derived from the historical trace information collected while the application is using resources.

18. The apparatus of claim 13 wherein the pool of resources associated with the computing utility facility is determined according to an estimated probability mass function.

19. The apparatus of claim 18 wherein the estimated probability mass function further includes a confidence interval corresponding to a sample size used for determining the estimated probability mass function.

20. The apparatus of claim 13 wherein the entitlement value operates as a metric for determining whether an application is entitled to the requested resources.

21. The apparatus of claim 20 wherein the entitlement value for an application is proportional to the burstiness of the application in view of resource usage derived from historical trace data.

22. The apparatus of claim 13 wherein the determining of if the determined requested amount for resources exceeds the entitlement value further depends on a confidence interval associated with the entitlement value and the number of sample values used to identify the entitlement value.

23. The apparatus of claim 13 wherein the instructions that when executed further cause the processor to claw back resources already allocated to the application when the application has exceeded a time limit for using the allocated resources.

24. The apparatus of claim 13, wherein the memory includes instructions that when executed cause the processor to:
  in response to the requested amount of resources exceeding the entitlement value associated with the sliding window, implement a throttling of access to the pool of resources associated with the computing utility facility by the application.

25. A non-transitory computer program product for policing resources in a computing utility facility, comprising instructions operable to cause a programmable processor to:
  intercept, by a processor, a request for an amount of resources from an application admitted to access a pool of resources associated with the computing utility facility and prior to utilization of the pool of resources to execute the application;
  acquire an entitlement profile associated with the application to determine if application is entitled to the requested amount of resources over a time period;
  identify an entitlement value and corresponding sliding window of the time period from the entitlement profile, wherein the entitlement profile associated with the application describes burstiness of the application over the time period, and the burstiness includes a measure of the application's expected bursts for resources;
  determine if the requested amount of resources exceeds the entitlement value associated with the sliding window;
  if the requested amount of resources does not exceed the entitlement value associated with the sliding window, indicate that the application is entitled to the requested amount of resources, or
  if the requested amount of resources exceeds the entitlement value associated with the sliding window, acquire additional sliding windows and corresponding additional entitlement values to determine if the request amount of resources exceeds the additional entitlement values in accordance with the entitlement profile and indicate that the application is not entitled to the requested amount of resources when the requested amount of resources exceeds the additional entitlement values or indicate that the application is entitled to the requested amount of resources when the requested amount of resources does not exceed the additional entitlement values.

26. The computer program product of claim 25, wherein the medium includes instructions operable to cause a programmable processor to:
  in response to the requested amount of resources exceeding the entitlement value associated with the sliding window, implement a throttling of access to the pool of resources associated with the computing utility facility by the application.

27. An apparatus for policing resources in a computing utility facility, comprising:
  means for intercepting a request for an amount of resources from an application admitted to access a pool of resources associated with the computing utility facility and prior to utilization of the pool of resources to execute the application;
  means for acquiring an entitlement profile associated with the application to determine if application is entitled to the requested amount of resources over a time period;
  means for identifying an entitlement value and corresponding sliding window of the time period from the entitlement profile, wherein the entitlement profile associated with the application describes burstiness of the application over the time period, and the burstiness includes a measure of the application's expected bursts for resources;
  means for determining if the requested amount of resources exceeds the entitlement value associated with the sliding window;
  means for indicating that the application is entitled to the requested amount of resources if the requested amount of resources does not exceed the entitlement value associated with the sliding window or if the requested amount of resources exceeds the entitlement value associated with the sliding window, in accordance with the entitlement profile, acquiring additional sliding windows and corresponding additional entitlement values to determine if the requested amount of resources exceeds the additional entitlement values, and indicating that the application is not entitled to the requested amount of resources when the requested amount of resources exceeds the additional entitlement values or indicating that the application is entitled to the requested amount of resources when the requested amount of resources does not exceed the additional entitlement values.

28. The apparatus of claim 27, the apparatus comprising:
  means for implementing a throttling of access to the pool of resources associated with the computing utility facility by the application in response to the requested amount of resources exceeding the entitlement value associated with the sliding window.

* * * * *